July 21, 1959 B. D. LOUGHLIN 2,896,014

GAMMA-CORRECTION APPARATUS

Filed July 22, 1954 5 Sheets-Sheet 1

July 21, 1959 B. D. LOUGHLIN 2,896,014

GAMMA-CORRECTION APPARATUS

Filed July 22, 1954 5 Sheets-Sheet 3

July 21, 1959 B. D. LOUGHLIN 2,896,014

GAMMA-CORRECTION APPARATUS

Filed July 22, 1954 5 Sheets-Sheet 4

July 21, 1959 B. D. LOUGHLIN 2,896,014

GAMMA-CORRECTION APPARATUS

Filed July 22, 1954 5 Sheets-Sheet 5

2,896,014
Patented July 21, 1959

2,896,014

GAMMA-CORRECTION APPARATUS

Bernard D. Loughlin, Lynbrook, N.Y., assignor to Hazeltine Research, Inc., Chicago, Ill., a corporation of Illinois Application July 22, 1954, Serial No. 445,106

17 Claims. (Cl. 178—5.4)

*General*

The present invention is directed to gamma-correction apparatus for a color-television system and, particularly, for such a color-television system as recently proposed by the National Television System Committee (NTSC) and standardized by the Federal Communications Commission for use in the United States.

In one form of the standardized color-television system more completely considered throughout the January 1954 issue of the Proceedings of the I.R.E. and, more specifically, at pages 46 to 48, inclusive, thereof information representative of a scene in color being televised is utilized to develop at the transmitter two substantially simultaneous signals, one of which is primarily representative of the brightness or luminance and the other of which is representative of the chrominance of the image. The latter signal is a modulated subcarrier wave signal the frequency of which is within the band width of the luminance signal and which has successive cycles each modulated at different phases by signal components representative of primary colors or hues, such as green, red, and blue, of the televised image. The composite video-frequency signal, hereinafter designated the NTSC signal, comprising the luminance signal and the modulated subcarrier wave signal is utilized at the transmitter to modulate a conventional radio-frequency carrier wave signal and the latter signal is radiated in a conventional manner.

A receiver in such a system intercepts the radio-frequency signal and derives the composite video-frequency signal therefrom. In one type of such receiver, the luminance signal is separated from the chrominance signal and applied to an intensity control electrode of an image-reproducing device. Three color-signal components individually representative of the three primary colors, for example, red, green, and blue of the image are derived from the subcarrier wave signal and are combined with the luminance signal in the image-reproducing device to effect reproduction of the color image.

Conventional image-reproducing devices normally have nonlinear input-output responses, that is, the ratio of the amplitude of the color signals applied thereto to the intensity of the light emitted therefrom is a power-law function, the power being designated as the gamma ($\alpha$) of the device and having a value of approximately 2.2. To obtain faithful reproduction by means of such devices, it is conventional, at the transmitter, to effect a nonlinear translation of individual ones of the color signals through different circuits each having an input-output response complementary to that of an image-reproducing device at a receiver. These gamma-corrected color signals are utilized in a linear manner to develop luminance and chrominance signals which are transmitted as hereinbefore described. For the purpose of distinguishing between different types of NTSC video-freqency signals, the type just described will be referred to hereinafter as the nonlinearized chromaticity type of NTSC signal, for reasons which will become more obvious hereinafter.

As more fully explained in an article in the January 1954 Proceedings of the I.R.E., pages 71–78, inclusive, by Bingley and entitled "Transfer Characteristics in NTSC Color Television," particularly with reference to Fig. 6 of that article, the nonlinearized chromaticity type of NTSC signal is satisfactory for effecting large area color reproduction in receivers employing simple, substantially linear circuits and a nonlinear image-reproducing apparatus. However, any advantage gained by simplicity of encoding and decoding such NTSC signal is obtained at the cost of achieving substantially less than optimum color reproduction. For example, when utilizing such NTSC signal there tends to be an increasing percentage of luminance information translated through the relatively narrow-band channel which should translate only the chrominance signal, especially as colors in the televised image become more saturated. This results in both the loss of fine detail because of the limited pass-band of the channel and an increase in low-frequency noise in saturated color areas of the reproduced image. Additionally, chromaticity information, which is a function of the ratio of the magnitude of the subcarrier wave signal and luminance signal, is not linear and this results in limiting the color-television system substantially to the present group of primary colors. It also results in an excessive magnitude of the subcarrier wave signal for all saturated colors and an excessive criticalness of hue with respect to the phase of the sub-carrier wave signal for all colors near complements of the primary colors.

As a result of experience with such NTSC signal, there has been some consideration of employing an NTSC signal in which the magnitude of the chromaticity information is linearly related to the ratio of the magnitudes of the chrominance and luminance signals and in which gamma-correction is directly effected on the luminance component of the composite video-frequency signal. This signal is considered in the aforementioned article by Bingley, particularly with reference to Fig. 8 of that article and will be referred to hereinafter as the linearized-chromaticity type of NTSC signal. The latter NTSC signal is less susceptible to noise, permits more nearly constant-luminance reproduction over all color and signal-intensity ranges, and is not limited to use with any predetermined group of primary colors.

Regardless of whether the luminance component of the composite video-frequency signal is gamma-corrected, as in the linearized chromaticity type of NTSC signal just described or both the luminance and chrominance components are corrected, as in the nonlinearized chromaticity type of NTSC signal previously described, such correction should preferably be effected on these components while they form the composite video-frequency signal rather than on the individual color-signal components in order to minimize the amount of equipment required. In this way only one gamma-correction device is needed where usually three such devices have been previously employed. The present invention is directed to gamma-correction apparatus employing a minimum number of gamma-correction devices regardless of the type of NTSC signal employed.

It is, therefore, an object of the present invention to provide a new and improved gamma-correction apparatus which avoids the limitations of prior such apparatus.

It is also an object of the present invention to provide a new and improved gamma-correction apparatus for effecting gamma-correction of at least a component of a composite video-frequency signal.

Additionally, it is an object of the present invention to provide a new and improved gamma-correction apparatus which is exceptionally flexible in effecting gamma-correction and relatively simple in construction.

It is also an object of the present invention to provide to provide a new and improved gamma-correction apparatus which effects gamma-correction of the luminance component of a composite video-frequency signal.

In accordance with the present invention, there is provided a gamma-correction apparatus for a color-television system which includes circuit means for supplying a composite television signal including a first signal primarily representative of the luminance and a modulated subcarrier wave signal representative of the chrominance of a televised image. The apparatus also includes means including a gamma-correcting device coupled to the supply circuit for translating the composite signal and having a nonlinear signal-translating characteristic for the first signal to correct the gamma of the first signal and a signal-translating characteristic for the subcarrier wave signal which varies as a function of the intensity of the first signal so as effectively to modulate the subcarrier wave signal by the first signal. Finally, the gamma-correction apparatus includes signal-modifying means responsive to the translated composite signal for effecting one degree of modification of a characteristic of the subcarrier wave signal and another degree of modification of the same characteristic of at least a low-frequency component of the first signal to develop a gamma-corrected composite television signal.

For a better understanding of the present invention, together with other and further objects thereof, reference is had to the following description taken in connection with the accompanying drawings, and its scope will be pointed out in the appended claims.

Figure 1:
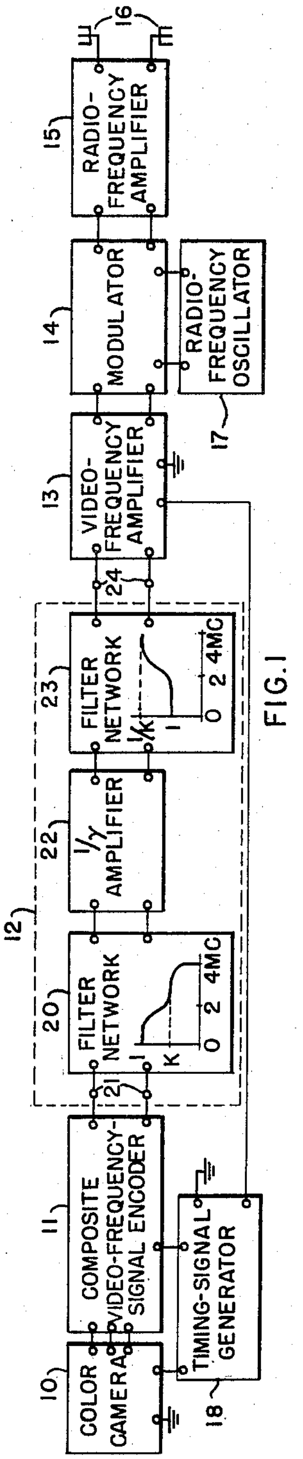

Referring to the drawings:

Fig. 1 is a schematic diagram of a color-television transmitter embodying a gamma-correction apparatus in accordance with the present invention;

Fig. 1*a* is a circuit diagram of one form of the gamma-correction apparatus of Fig. 1;

Fig. 1*b* represents a group of curves useful in explaining the operation of the apparatus of Fig. 1*a*;

Fig. 2 is a schematic diagram of a color-television receiver including gamma-correction apparatus in accordance with the present invention;

Fig. 2*a* is a circuit diagram of a component of the gamma-correction apparatus of Fig. 2;

Fig. 3 is a schematic diagram of another embodiment of the gamma-correction apparatus of Fig. 2;

Fig. 3*a* is a schematic diagram of a modified form of part of the embodiment of Fig. 3;

*Description of transmitter of Fig. 1*

Referring now particularly to Fig. 1 of the drawings, there is represented a color-television transmitter for developing and transmitting a composite video-frequency signal, more specifically, a linearized-chromaticity type of NTSC signal including luminance and chrominance components. This transmitter includes in cascade, in the order named, a color camera 10, a composite video-frequency encoder 11, a gamma-correction apparatus 12 in accordance with the present invention and to be described more fully hereinafter, a video-frequency amplifier 13, a modulator 14, and a radio-frequency amplifier 15 having an antenna system 16 coupled to the output circuit thereof. The modulator 14 has a radio-frequency oscillator 17 coupled to an input circuit thereof for effecting modulation of the signal developed in the oscillator 17 by the signals translated through the amplifier 13. The color camera 10, composite video-frequency signal encoder 11, and the amplifier 13 have input circuits individually coupled to different output circuits of a timing-signal generator 18.

Considering the units 10, 11, and 18 in more detail, the camera 10 may include one or more cathode-ray signal generating tubes, for example, three cathode-ray tubes individually responsive to the primary colors red, green, and blue of an image to be televised and including usual electron-gun structures and photosensitive targets with conventional line-scanning and field-scanning means. The timing signal generator 18 includes, for example, a master generator, which is conventionally a subcarrier wave-signal generator for developing a signal of approximately 3.6 megacycles, line-scanning and field-scanning generators, and a blanking pulse generator, the latter three generators all being synchronized with and under the control of the master generator. As is conventional, the output of the generator 18 is coupled to the amplifier 13 to provide line-frequency, field-frequency, and color-synchronizing signals in the composite video-frequency signal. The line-scanning, field-scanning, and blanking pulse generators are further coupled to the camera 10 and the subcarrier wave-signal generator is coupled to the encoder 11. The composite video-frequency signal encoder 11 includes, for example, conventional matrixing apparatus for developing I and Q chrominance signals and a Y luminance signal from the red, green, and blue color signals applied thereto and a pair of modulators to which the subcarrier wave signal developed in the generator 18 is applied in quadrature. Modulation of such quadrature subcarrier wave signals is effected by the I and Q components to develop a resultant composite subcarrier wave or chrominance signal modulated in quadrature by the I and Q components. Additionally, such encoder includes an adder circuit for combining the Y or luminance component and the resultant composite subcarrier wave-signal or chrominance component to develop a composite video-frequency signal.

The units or electrical components 10, 11, and 13–18, inclusive, may be of conventional construction, such as well known in the art or more fully described in the January 1954 issue of the I.R.F. Proceedings and, therefore, no more detailed description thereof is believed necessary.

*Operation of transmitter of Fig. 1*

Neglecting for the moment the detailed operation and description of the gamma-correction apparatus 12, in accordance with the present invention, the image of the scene to be televised is focused on the target of each camera tube of the color camera 10 and the cathode-ray beams in such tubes are developed, accelerated, individually focused on the separate targets, and caused to scan rasters with respect to such targets in a conventional manner. Different optical color filters individually translate the red, green, and blue colors of the televised image to different ones of the image targets in the different tubes. Successive series of fields of parallel lines are scanned on such targets and the blanking pulses applied to such tubes suppress or block out signal transmission from such tubes during retrace portions of the scanning cycles. The photosensitive elements of a camera tube target being electrically affected by the varying values of light and shade of incremental areas of the image focused thereon cause the cathode-ray beam scanning such target to develop voltages of correspondingly varying amplitudes. These voltages are developed in the output circuit of each of the camera tubes and separately supplied as signals representative of the red, green, and blue color primaries of the color-televised image to the matrixing apparatus in the encoder 11. In such matrixing apparatus the signals representative of the primary colors of the image are combined to develop two signals I and Q representative of other component colors of the image and to develop a luminance signal Y representative of the brightness of the image. The I and Q signals individually modulate the subcarrier-wave signal applied to the encoder from the generator 18 at quadrature phases thereof to develop the chrominance signal, that is, a subcarrier wave signal modulated in quadrature by signals representative of component colors of the televised image. Also, in the encoder 11 the chrominance and luminance signals are additively combined to develop a composite video-frequency signal. This composite video-frequency signal is translated through the unit 12, amplified in the unit 13 and modulates the radio-frequency signal in the modulator 14. The modulated radio-frequency signal is amplified by the unit 15 and radiated by means of the antenna system 16.

Figures 1A, 1B:
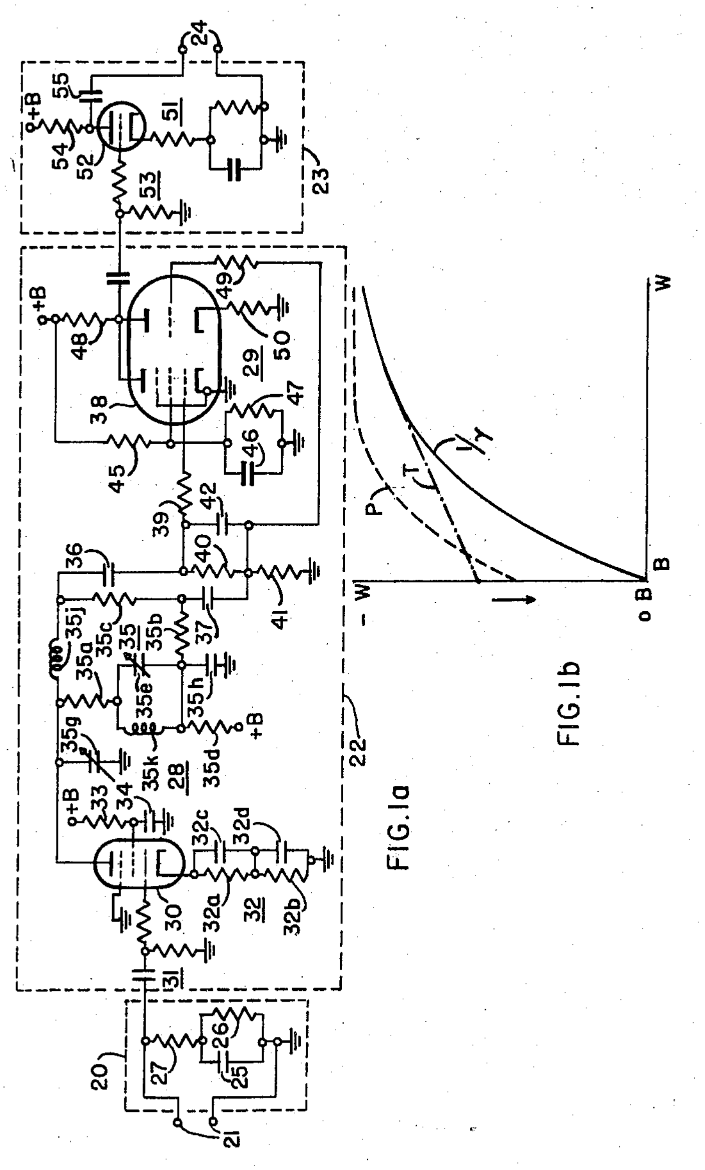

*Description of gamma-correction apparatus of Figs. 1 and 1a*

The gamma-correction apparatus 12 of Fig. 1 comprises circuit means for supplying a composite television signal including a first signal primarily representative of the luminance and a modulated subcarrier wave signal representative of the chrominance of a televised image, specifically, a filter network 20 having the input circuit thereof coupled through a pair of terminals 21, 21 to the output circuit of the encoder 11. The network 20 has a non-uniform pass band, such as represented in Fig. 1, for translating the first and subcarrier wave signals with different degrees of attenuation.

Additionally, the apparatus 12 of Fig. 1 includes means including a gamma-correcting device coupled to the supply circuit for translating the composite signal and having a nonlinear signal translating characteristic for at least the first signal, that is, for at least the low-frequency component of the luminance signal and a signal-translating characteristic for the subcarrier wave signal which varies as a function of the intensity of the luminance signal so as effectively to modulate the subcarrier wave signal by the luminance signal. More specifically, such gamma-correcting device includes a nonlinear amplifier, specifically a $1/\gamma$ amplifier 22 coupled to the output circuit of the unit 20 for effecting such modulation of the subcarrier wave signal translated through the network 20 and for nonlinearly translating the low-frequency component of the first signal translated through the unit 20 to effect such gamma-correction thereof. Referring now to Fig. 1*a* where the units 20 and 22 are represented in more detail, the unit 20 includes a parallel circuit of a condenser 25 and a resistor 26 coupled in series with a resistor 27 across the input terminals 21, 21 and specifically across the input circuit of the $1/\gamma$ amplifier 22. For reasons which will be explained more fully hereinafter, the filter network 20 has a pass band such that signals having frequencies between 0 and 2 megacycles, for example, that portion of the band occupied by the low-frequency component of the luminance signal, are translated through such network with a magnitude which is substantially more than, for example, five times that of signals having frequencies between 2 and 4 megacycles, for example, the subcarrier wave signal and its side bands.

The $1/\gamma$ amplifier 22 includes a driver amplifier 28, the output circuit of which is coupled to an amplifier 29 having a $1/\gamma$ signal-translating characteristic. In the considerations to follow, 2.2 is considered generally to represent the gamma of conventional picture-reproducing tubes and, therefore, the signal-translating characteristic of the amplifier 29 is such that a potential E applied thereto, and within a predetermined range of potentials, becomes a potential $E^{1/2.2}$ in the output circuit thereof. In other words the response of the amplifier 29 is a power function having the exponent 1/2.2. The driver amplifier 28 includes a pentode tube 30 having the first grid thereof capacitively coupled to the output circuit of the network 20 through an input circuit 31 and the cathode thereof connected to ground through a biasing and high-frequency compensating circuit including a pair of parallel-connected resistor-condenser circuits 32 connected in series. The suppressor grid of such tube is connected to ground and the screen grid thereof is coupled through a current-limiting resistor 33 to a source of +B potential and through a by-pass condenser 34 to ground. The anode of the tube 30 is coupled to the source of +B potential through a decoupling resistor 35*d* and an anode load circuit 35 having resistors 35*a*–35*c*, inclusive, condensers 35*e*, 35*g*, and 35*h*, and inductors 35*j* and 35*k*. The elements in such load circuit are proportioned in a conventional manner to effect wide band voltage division of the signal developed at the anode of the tube 30. More specifically, the intensity of the signals developed at the junction of inductor 35*j* and resistor 35*c* is, for example, approximately five times that developed at the junction of the resistors 35*c* and 35*b*. The anode load circuit 35 is capacitively coupled to an input circuit of the nonlinear amplifier 29 through a pair of coupling condensers 36 and 37. The amplifier 29 includes a tube 38 which is a combination pentode and triode. The control-electrode circuit of the pentode section is coupled through a parasitic suppression resistor 39 to the higher potential terminal of a voltage divider comprising a pair of resistors 40 and 41, the resistor 40 having a condenser 42 in parallel therewith to compensate for the stray capacitance across the resistor 41 and to provide wide band voltage division. The cathode of the pentode section of the tube 38 is connected to ground, while the screen electrode thereof is coupled through a current-limiting resistor 45 to the source of +B potential and through a by-pass circuit, comprising in parallel a condenser 46 and a resistor 47, to ground. The anode of the pentode section is coupled to the anode of the triode section and both anodes are coupled through a load resistor 48 to the source of +B potential. The control electrode of the triode section is coupled through a parasitic suppression resistor 49 to the junction of the voltage divider resistors 40 and 41, while the cathode of such triode section is connected through a biasing resistor 50 to ground. The circuit elements of the pentode and triode sections of the tube 38 are relatively proportioned so that the pentode section has a relatively high nonlinear gain for black signals, but cuts off on medium-level or gray signals. The triode section then provides the nonlinear gain for the range of the medium gray to white signals. Such responses are represented by curves P (pentode) and T (triode) of Fig. 1*b*, resulting in the composite $1/\gamma$ response. Additionally, in conducting on the black signals, the grid-cathode circuit of the pentode section of the tube 38 effects D.C. restoration by means of grid-cathode current. With the circuit values to be presented hereinafter, the amplifier 29 has a signal-translating characteristic which follows a 1/2.2 function for a contrast range of approximately 25:1. This corresponds to a black-to-white gain ratio of about 6:1.

The gamma-correction apparatus also includes a signal-modifying device responsive to the translated composite signal for effecting one degree of modification of a characteristic of the subcarrier-wave signal and another degree of modification of the same characteristic of at least the low-frequency component of the first signal to develop a gamma-corrected composite television signal. More specifically, the modifying device of Fig. 1 comprises another nonuniform filter network 23, the input circuit of which is coupled to the amplifier 22 and the output circuit of which is coupled through the pair of terminals 24, 24 to the video-frequency amplifier 13. Such network has a frequency-translation characteristic such as represented in Fig. 1, that is, signals in the 2–4 megacycle range are translated with less attenuation than the signals in the 0–2 megacycle range. The inverse of the ratio utilized with respect to the network 20 is employed, if the intensities of the signals in the input circuit of the unit 20 and output circuit of the unit 23 are substantially the same, so that the networks 20 and 23 complement one another to provide an over-all translation characteristic which is uniform over the frequency range of 0–4 megacycles. For example, in the network 23 the amplitude of the subcarrier wave signal is translated with a magnitude which is approximately five times that of the translation of the 0–2 megacycle components of the first or luminance signal.

To ensure the complementary operation of the units 20 and 23, a filter network similar to that described for the unit 20 is utilized in the unit 23 in a feed-back path. Referring to Fig. 1*a*, a filter network 51, similar to the network 20 and having values for the circuit elements thereof, the cathode impedance of the tube 52 being considered as part of one of such elements, in the same ratio as the elements of the network 20, is coupled between the cathode of a triode 52 and ground. The tube 52 is part of an amplifier which is capacitively coupled through a grid-biasing circuit 53 to the anodes of the tube 38 in the unit 22. The anode of the tube 52 is coupled through a load resistor 54 to the source of +B potential and a coupling condenser 55 to the ungrounded one of the output terminals 24, 24. The network 51 in the cathode circuit of the tube 52 effectively causes degeneration, thereby having an effect the inverse of that of the network 20.

*Explanation of operation of gamma-correction apparatus of Figs. 1 and 1a*

As previously stated herein, it is desired to develop at the transmitter for utilization at the receiver a linearized chromaticity type of NTSC signal, that is, a composite video-frequency signal in which the magnitude of the chrominance information is linearly related to the ratio of the magnitudes of the chrominance and luminance signals and in which nonlinear translation to a predetermined degree, that is, to such degree as to provide gamma-correction, is effected on the luminance component of the composite signal. Such a composite signal S may be mathematically defined as follows:

$$S=Y^{1/\gamma}+\frac{Y^{1/\gamma}}{\gamma Y}\left[\frac{R-Y}{1.14}\cos\omega t+\frac{B-Y}{2.03}\sin\omega t\right] \quad (1)$$

where:

Y represents luminance, and

*R—Y* and *B—Y* represent, respectively, the red and blue modulation components in quadrature phase on the subcarrier wave or chrominance signal.

In such equation $Y^{1/\gamma}$ represents the gamma-corrected luminance component and the second term represents chromaticity, being the chrominance signal multiplied by $$\frac{Y^{1/\gamma}}{\gamma Y}$$

so that chromaticity is linearly related to the ratio of chrominance to the gamma-corrected luminance component. The composite video-frequency signal initially developed at the transmitter and applied to a gamma corrector such as the unit 12 may be defined as follows:

$$S_1=Y+\frac{R-Y}{1.14}\cos\omega t+\frac{B-Y}{2.03}\sin\omega t \quad (2)$$

This signal will be hereinafter referred to as the linear composite signal and is to be converted into the linearized chromaticity type of NTSC signal defined by Equation 1 by translation through the gamma-correction apparatus 12.

Before considering the specific details of the unit 12 in effecting such result, it will be helpful generally to consider the manner in which one component of a composite signal may be nonlinearly translated while another component of such signal is at the same time linearly translated through a device. Assume that a signal $s_1$, which is to be applied and translated through apparatus which has a $1/\gamma$ signal-translating characteristic such as represented in Fig. 1*b*, is defined as follows:

$$s_1=x+a \quad (3)$$

and that the signal developed at the output of such apparatus is defined as follows:

$$s=(x+a)^{1/\gamma} \quad (4)$$

When expanded, Equation 4 becomes:

$$s=x^{1/\gamma}\left[1+\frac{1}{\gamma}\left(\frac{a}{x}\right)-\frac{\gamma-1}{2\gamma^2}\left(\frac{a}{x}\right)^2+\frac{(\gamma-1)(2\gamma-1)}{6\gamma^3}\left(\frac{a}{x}\right)^3\cdots\right] \quad (5)$$

In Equation 5 if the factor $$\frac{a}{x}$$

is small compared to unity and $\gamma$ is larger than unity, then, for all practical purposes, Equation 5 reduces to:

$$s=x^{1/\gamma}\left[1+\frac{1}{\gamma}\left(\frac{a}{x}\right)\right] \quad (6)$$

Comparing Equations 1 and 5, if the term $x$ is replaced by the luminance term Y and the term $a$ is replaced by the chrominance term $$\frac{R-Y}{1.14}\cos\omega t+\frac{B-Y}{2.03}\sin\omega t$$

and if the assumption of the expression $$\frac{a}{x}$$

being small with respect to unity is complied with by causing the ratio of the chrominance and luminance signals to be small, then Equation 6 is identical with Equation 1 rearranged as follows:

$$S=Y^{1/\gamma}\left[1+\frac{1}{\gamma Y}\left(\frac{R-Y}{1.14}\cos\omega t+\frac{B-Y}{2.03}\sin\omega t\right)\right] \quad (7)$$

In other words, if the ratio of the chrominance and luminance signals is made substantially less than unity in the composite signal applied to a device having a $1/\gamma$ signal-translating characteristic, then translation of such composite signal through the nonlinear device causes the luminance component to be nonlinearly translated. This is the manner in which the gamma-correction apparatus 12 translates the linear composite video-frequency signal applied thereto and defined by Equation 2 to develop the linearized chromaticity type of NTSC signal defined by Equations 1 and 7 above.

Considering in detail the operation of the units of the apparatus 12, the filter network 20 attenuates the chrominance signal with respect to at least the low-frequency components of the luminance signal by a factor of, for example, 5:1 so that the ratio of the magnitudes of the chrominance and luminance signals is approximately one-fifth and, therefore, complies with a requirement expressed above. The $1/\gamma$ amplifier 22 translates such composite signal so that at least the low-frequency components of the luminance signal are raised to the $1/\gamma$ power while the chromaticity information is substantially linearly translated therethrough for the reasons more fully expressed above. The network 23 attenuates the low-frequency luminance components with respect to the chrominance components by a factor of approximately 5 and thus, the relative magnitudes of the low-frequency luminance components and the chrominance components, as existed when the linear composite signal was applied to the apparatus 12, are re-established in the output circuit of the apparatus 12 modified only by the gamma-correction of the luminance component. In addition, the chrominance component is modulated by the luminance component to develop a modified chrominance component as previously explained in connection with Equation 7 which represents the amplitude of the chrominance component as a function of the luminance component.

The details of operation of the units 20, 22, and 23 may be understood by considering Fig. 1*a*. A linear composite video-frequency signal is applied to the network 20 from a constant-current source in the output circuit of the encoder 11 of Fig. 1. The nonuniform filter network 20, being a conventional resistor-condenser network proportioned to have the pass band represented for such unit in Fig. 1, applies to the driver tube 30 a composite video-frequency signal in which the chrominance component has a magnitude which, for most of the elemental areas in a color image, is no greater than one-fifth that of the low-frequency luminance components. The driver tube 30 is a linear device and develops in the anode load circuit 35 an amplified composite signal. By means of the wide band voltage division effected in the anode circuit 35, a relatively high amplitude composite signal is applied to the control electrode of the pentode section of the tube 38 while a fraction of the amplitude of such composite signal is applied to the control electrode of the triode section of the tube 38 to effect the responses represented by curves P and T of Fig. 1*b*. The pentode section draws grid current at approximately the potential representing black to effect direct-current restoration and, having the response represented by curve P of Fig. 1*b*, effects nonlinear translation and amplification for signals representing shades in the range between black and medium gray, that is, for signals in the range between substantially zero for black and medium negative potentials. The pentode section cuts off as the applied signals become more negative in potential representing shades in the range between medium gray and white and the triode section of the tube 38 provides nonlinear translation and amplification for such signals. The combined output signals of the pentode and triode sections of the tube 38, as represented by curve $1/\gamma$, are developed across the load resistor 48. Thus the signal developed in the anode load circuit of the tube 38 is a linearized chromaticity type of NTSC signal such as defined by Equation 1 above in which the chrominance component has been attenuated by the network 20 with respect to the low-frequency luminance components. The filter circuit 51 in the network 23 is a duplicate of the network 20, if these networks are the only circuits effecting the desired nonuniform signal translation, and, being in the cathode circuit of the amplifier tube 52, has an effect upon the signal translated through the tube 52 which is the inverse of that of the network 20 on the signal translated therethrough. This inverse operation in the network 23 causes a linearized chromaticity type of NTSC signal with proper relative signal levels of the luminance and chrominance components thereof to be developed at the output terminals 24, 24.

While applicant does not intend to be limited to any particular circuit values in the embodiment of the invention just described, there follows a set of circuit values for the more important circuit elements which have been found to be particularly suitable for apparatus such as represented by Fig. 1*a*:

| | | |
|---|---|---|
| Resistor **32***a* | ohms | 18 |
| Resistor **32***b* | do | 150 |
| Resistor **33** | kilohms | 56 |
| Resistors **35***a* and **35***b* | do | 3.3 |
| Resistor **35***c* | do | 6.8 |
| Resistor **35***d* | do | 4.7 |
| Resistors **39**, **49** and **50** | ohms | 100 |
| Resistor **40** | megohms | 2.2 |
| Resistor **41** | do | 1 |
| Resistor **45** | kilohms | 25 |
| Resistor **47** | do | 2.3 |
| Resistor **48** | do | 15 |
| Condenser **32***c* | micromicrofarads | 5000 |
| Condenser **32***d* | microfarads | 3000 |
| Condensers **34** and **42** | do | 20 |
| Condensers **35***g* and **35***e* | micromicrofarads | 3–12 |
| Condenser **35***h* | microfarads | 40 |
| Condensers **36** and **37** | do | .068 |
| Inductor **35***j* | microhenries | 100 |
| Inductor **35***k* | do | 50 |
| Tube **30** | | Type 6AH6 |
| Tube **38** | | Type 6U8 |
| Potential +B | volts | 300 |

Figure 2:
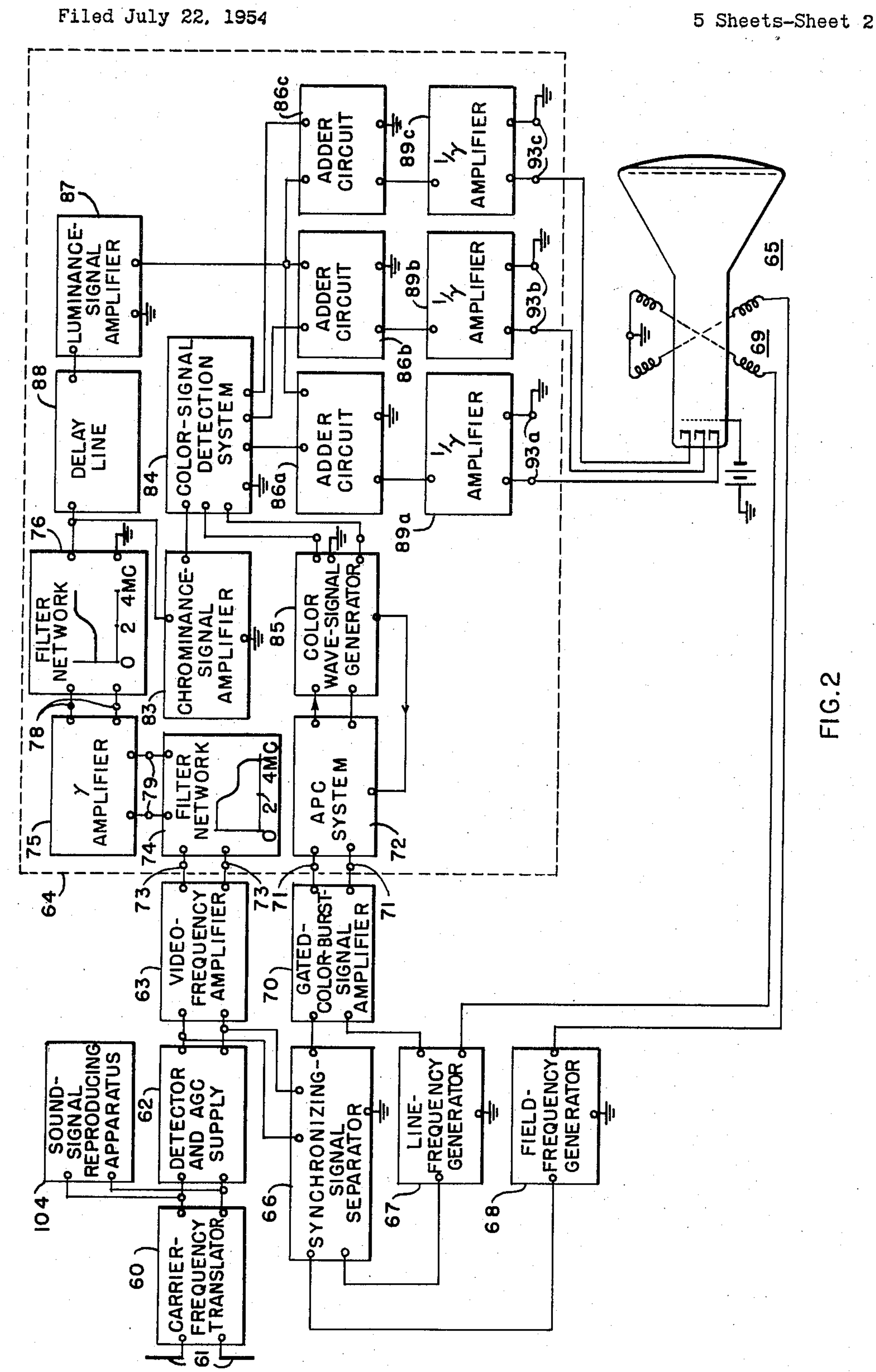

*Description of receiver of Fig. 2*

Referring now to Fig. 2 of the drawings, there is represented a color-television receiver of the superheterodyne type such as may utilize a composite video-frequency signal of the type developed in the transmitter of Fig. 1. The receiver of Fig. 2 includes a carrier-frequency translator 60 having an input circuit coupled to an antenna system 61. It will be understood that the unit 60 may include in a conventional manner one or more stages of wave-signal amplification, an oscillator-modulator, and one or more stages of intermediate-frequency amplification if such are desired. There are coupled to the output circuit of the unit 60 in cascade in the order named a detector and automatic-gain-control (AGC) supply 62, a video-frequency amplifier 63 of one or more stages, a gamma-correction apparatus 64 including color-signal deriving apparatus, and an image-reproducing device 65 of the cathode-ray tube type. An output circuit of the detector 62 is coupled through a synchronizing-signal separator 66 to a line-frequency generator 67 and a field-frequency generator 68, the output circuits of the latter generators being coupled to line-frequency and field-frequency deflection windings 69 in the device 65. The separator 66 and the generator 67 are coupled through a gated color burst signal amplifier 70 and a pair of input terminals 71 to an automatic-phase-control system 72 in the apparatus 64.

The output circuit of the translator is also coupled to a conventional sound-signal reproducing apparatus 104 which may include a conventional sound-signal intermediate-frequency amplifier, a frequency detector, an audio-frequency amplifier, and a sound-signal reproducing device. The automatic-gain-control supply in the unit 62 is coupled to one or more of the input circuits of the different stages in the unit 60 in a well-known manner.

The antenna system 61 and the units or circuit elements 62, 63, 65–69, inclusive, and 104 may be of conventional construction and operation so that a detailed description and explanation of the operation thereof are considered unnecessary herein.

*General explanation of receiver of Fig. 2*

Considering briefly now the general operation of the above-described receiver as a whole, radio-frequency television signals including sound signals are intercepted by the antenna 61, are selected and amplified in the translator 60, and applied to the detector 62 wherein the modulation components thereof are derived. These derived components, including synchronizing components as well as picture signals, are amplified in the video-frequency amplifier 63 and applied to the gamma-correction apparatus 64 which, as has previously been stated, includes apparatus for deriving the different color signals representative of the primary colors of a televised image. The details of such derivation will be explained more fully hereinafter. These derived color signals, after gamma-correction in a manner also to be considered more fully hereinafter, are individually applied to different ones of the cathodes in the picture tube 65.

The synchronizing components, including line-frequency and field-frequency signals and a color burst signal for maintaining the derivation of the color signals in the unit 64 in synchronism with a corresponding modulation unit at the transmitter, are separated from each other and from the picture signals in the unit 66. The line-frequency and field-frequency synchronizing components are utilized to control the operation of the generators 67 and 68, respectively, and the signals developed in the output circuits of these generators are applied to the deflection windings 69 in the device 65 to cause the electron beams emitted from the cathodes of the picture tube to trace a rectilinear pattern on the image screen thereof. The intensities of the beams emitted from the cathodes are individually controlled by the color signals applied thereto from the apparatus 64 and excite the different phosphors in varying degrees for developing the different primary colors to reproduce the primary color images of the televised image. These primary color images are optically combined to reproduce in color the televised image.

The automatic-gain-control potential developed in the unit 62 is applied to the gain-control circuits of the stages in the unit 60 to maintain the signal input to the detector 62 and the apparatus 104 within a relatively narrow range for a wide range of signal intensities. The sound components of the received television signal are applied to the apparatus 104 wherein audio-frequency signals are derived from such components in a conventional manner by a sound-signal detector, are amplified, and are utilized to reproduce sound.

*Description of gamma-correction apparatus of Fig. 2*

The previously mentioned supply circuit of a composite television signal includes, in the apparatus 64 of Fig. 2, the output circuit of the amplifier 63, the pair of terminals 73, 73, and a filter network 74 which corresponds to the network 20 of Fig. 1. It should be understood that the network 74 is represented as an entity solely for clarity and simplicity of description and explanation. Actually such network could effectively be part of one or more of the preceding circuits, for example, the video-frequency amplifier 63. The gamma-correcting device in the apparatus 64 includes a gamma amplifier 75 which will now be considered in more detail with respect to Fig. 2*a*.

Figure 2A:
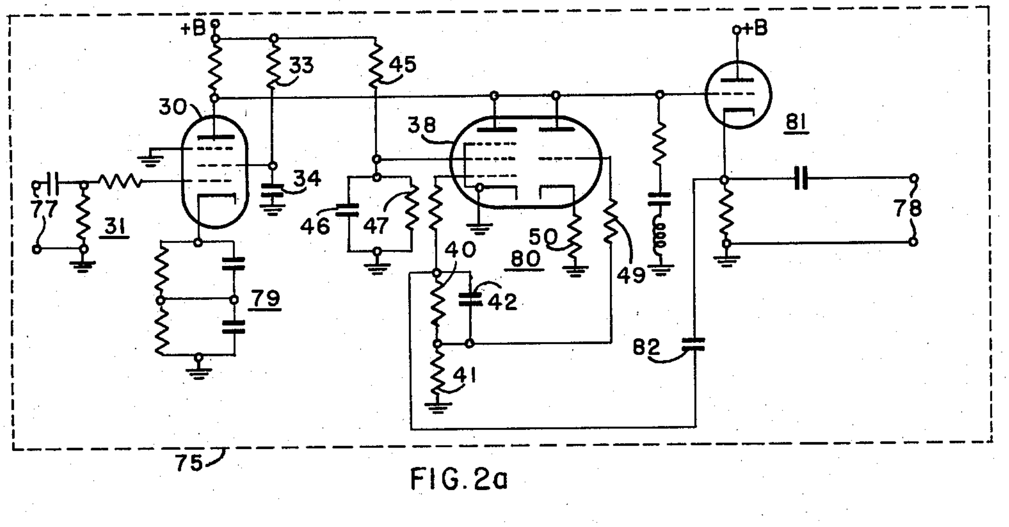

The gamma amplifier of Fig. 2*a* includes a driver amplifier 79 similar to the driver amplifier 32 of Fig. 1*a* and employing the $1/\gamma$ amplifier 80, which is substantially the equivalent of the $1/\gamma$ amplifier 29 of Fig. 1*a*, as a shunt anode load circuit. Since the amplifiers 79, 80 have many circuits and elements corresponding to those of the amplifiers 28, 29 of Fig. 1*a*, such circuits and elements are indicated by the same reference numerals. The units 79 and 80 differ from the units 28 and 29 of Fig. 1*a* substantially only in that in Fig. 2*a* the $1/\gamma$ amplifier 80 is in shunt with the conventional anode load circuit for the amplifier 79. By being employed in this manner the unit 80 becomes a gamma amplifier instead of a $1/\gamma$ amplifier. The output circuit of the amplifier 80 is coupled through a cathode follower 81 to a pair of output terminals 78, 78. The cathode of the unit 81 is coupled through a condenser 82 to the input circuit of the gamma amplifier 80 to apply the composite signal developed in the output circuit of the amplifier 79 to the amplifier 80.

Referring again to Fig. 2, the signal-modifying device in the apparatus 64 comprises a filter network 76 which corresponds to the filter network 23 of Fig. 1 and which could be included, for example, in a delay line 88 or an amplifier 87, to be considered hereinafter, or the effects of which could be obtained by proportioning the relative gains of the luminance and chrominance channels. Additionally, the apparatus 64 includes means for deriving the modulation components of the modified subcarrier wave signal developed in the output circuit of the network 76, specifically, in cascade in the order named, a chrominance-signal amplifier 83 and a color-signal detection system 84 with a color wave-signal generator 85 having a pair of output circuits coupled to a pair of input circuits of the system 84. The generator 85 is of a conventional sine-wave type for developing a pair of quadrature signals having the same frequency and a predetermined phase relation with respect to the subcarrier wave signal. An APC system 72 is coupled between the color burst signal amplifier 70 and a frequency-control circuit of the generator 85 to maintain such frequency and phase relation.

The chrominance-signal amplifier 83 is a conventional amplifier for translating and amplifying the modulated subcarrier wave signal with its side bands and, therefore, preferably has a pass band of approximately 2.5–4.1 megacycles. The color-signal detection system 84 may be of a type more fully described at pages 334–343, inclusive, of the January 1954 I.R.E. Briefly, such a detection system includes a pair of synchronous detectors for deriving color-signal components from quadrature phases of the subcarrier wave signal, input circuits of these detectors being coupled to the output circuit of the amplifier 83 and individually coupled to different ones of the output circuits of the generator 85. Such detection system further includes low-frequency filter networks for translating the derived components and matrixing apparatus for utilizing the derived components to develop three color-signal components representative of the three primary colors of the televised image, for example, of the colors green, red, and blue.

The apparatus 64 of Fig. 2 further includes means for combining the derived components and the linear first signal or luminance signal to develop color signals. More specifically, such combining means includes a plurality of adder circuits **86*a*, 86*b*, and 86*c* having input circuits individually coupled to different output circuits of the detection system 84 and other input circuits coupled in common through a luminance-signal amplifier 87 and a delay line 88 to the output circuit of the filter network 76. The delay line 88 is proportioned to cause the time of translation of the luminance signal to the units 86*a*–86*c*, inclusive, to be equal to the effective time of translation of the color-signal components to such units. The amplifier 87** is a conventional wide band amplifier which may include a trap circuit for signals at the frequency of the subcarrier wave signal.

Finally, the apparatus 64 of Fig. 2 includes a plurality of other gamma-correcting devices having signal-translating characteristics substantially equal to $1/\gamma$ for translating the color signals developed in the output circuits of the units **86*a*–86*c*, inclusive, to develop gamma-corrected color signals. More specifically, such plurality of other gamma-correcting devices includes three $1/\gamma$ amplifiers 89*a*, 89*b* and 89*c* having input circuits coupled respectively to the output circuits of the adder circuits 86*a*, 86*b*, and 86*c* and having output circuits individually coupled to different ones of the cathodes in the image-reproducing device 65. Since the $1/\gamma$ amplifier 29** of Fig. 1*a* may be utilized for each of such $1/\gamma$ amplifiers, no additional description or explanation of such amplifiers is believed necessary than that provided with respect to Fig. 1*a*.

Except for the units 74–76, inclusive, and the units **89*a*–89*c*, inclusive, the color-signal deriving apparatus included in the apparatus 64 may be of conventional construction and operation such as presented in the article at pages 334–343, inclusive, of the January 1954 issue of the I.R.E. Therefore, no detailed description of other than the units 74–76, inclusive, and 89*a*–89*c***, inclusive, and their combination with conventional units is believed necessary herein.

*Explanation of operation of apparatus 64 of Fig. 2*

Due to the previously considered gamma-correction at the transmitter, the linearized chromatically type of NTSC signal applied through the pair of terminals 73, 73 is one in which the magnitude of the luminance signal has been gamma-corrected, that is, is a power function with an exponent of $1/\gamma$ while the chrominance signal is substantially linear though modulated to provide chromatically information linearly related to the ratio of the magnitudes of the chrominance and luminance signals. In other words, the signal applied to the unit 74 is that defined by Equation 1 above.

In a receiver using a conventional type of picture tube having a gamma response as previously discussed herein, the color signals ultimately to be developed in such receiver should be gamma-corrected, that is, each of them should be translated through a device having a nonlinear signal-translating characteristic which is the inverse of, or complementary to, that of the picture tube. In other words, each of the color signals should be, at least effectively, translated through a device having a $1/\gamma$ translating characteristic. One manner of doing this is to convert the linearized-chromaticity type of NTSC signal applied to the pair of terminals 73, 73, and just described, into a linear composite video-frequency signal in which both the luminance and chrominance components are linearly related to the corresponding components initially developed at the transmitter, that is, into a composite signal having no gamma-correction. The color-signal components are then derived from such linear composite signal and combined with the luminance component to develop the desired color signals. Each of these color signals is then gamma-corrected by being translated through a device having a $1/\gamma$ translation characteristic. The gamma-correction apparatus of Fig. 2 operates in this manner and such operation will now be considered in more detail.

The filter network 74 translates the linearized-chromaticity type of NTSC signal applied to the terminals 73, 73 with, for example, five times the attenuation for the subcarrier wave or chrominance signal as for the low-frequency components of the luminance signal. Considering now Fig. 2*a*, the driver amplifier 79 provides wide band amplification of the signal applied thereto but the $1/\gamma$ amplifier 80 being in shunt with the anode load circuit thereof and having a $1/\gamma$ signal-translating characteristic for the feed-back signal applied thereto from the output circuit of the cathode follower 81 effectively varies the load impedance of the unit 80 so that the load has the response of a power function with a $1/\gamma$ exponent. In this way, gamma-amplification of the relatively high magnitude luminance signal and substantially linear amplification of the relatively low magnitude chrominance signal are effected. The reason for the difference in linearity of amplification has been previously explained with respect to similar amplification at the transmitter. Thus, the signal developed in the output circuit of the gamma amplifier 75 is substantially a completely linear signal in that both the luminance and chrominance components thereof are linearly related to the corresponding components of the complete video-frequency signal initially developed at the transmitter. In other words, the gamma amplifier 75 effectively nullifies the $1/\gamma$ amplification of the luminance signal at the transmitter so that such luminance signal after having been translated through both the $1/\gamma$ amplifier at the transmitter and the gamma amplifier 75 at the receiver is substantially the same as though it had been translated through a single linear amplifier. These complementary operations at the transmitter and receiver would be purposeless except for the fact that transmission of the linearized-chromaticity type of NTSC signal provides improved immunity to noise resulting in less luminance disturbance in a reproduced image. The subcarrier wave-signal component of the linear composite video-frequency signal is translated through the chrominance-signal amplifier 83 and applied to the color-signal detection system 84 wherein, for example, the I and Q modulation components thereof are derived and these are matrixed into *R—Y*, *B—Y*, and *G—Y* components in the manner more fully described at pages 334–343, inclusive, of the January 1954 issue of the Proceedings of the I.R.E. The luminance component of the linear composite video-frequency signal is translated through the delay line 88 with sufficient delay to equal the effective translation delay of the *R—Y*, *B—Y*, and *G—Y* color components through the units 83 and 84, is amplified in the unit 87 and applied to input circuits of the adder circuits **86*a*, 86*b*, and 86*c***. The *R—Y*, *B—Y*, and *G—Y* components in the output circuit of the system 84 are individually applied to different ones of these adder circuits and are combined with the Y or luminance signal therein to develop in the output circuits thereof R, B, and G color signals representative, respectively, of the red, blue, and green of the televised image. Since, as has been previously stated herein, the image-reproducing device 65 has a gamma, that is, a nonlinear response characteristic for each of the color signals R, B, and G, in order to compensate for such nonlinearity, these color signals are initially translated through individual ones of the $1/\gamma$ amplifiers **89*a*, 89*b*, and 89*c*. The color signals are individually applied to different ones of the cathodes in the device 65** to control the intensity of the electrons emitted from such cathodes for developing primary color images which are optically combined to reproduce the televised image in color.

Though the above description and explanation of operation of the receiver of Fig. 2 might give the impression that a receiver for utilizing a linearized-chromaticity type of NTSC signal inherently includes more circuit components than a conventional receiver, such is only so because of the limitations of present reproducing devices. The additional circuit components in the receiver described are the filter networks 74 and 76 and the nonlinear amplifiers 75, **89*a*, 89*b* and 89*c*. Of these, the networks 74 and 76 can be made components of, for example, the amplifiers 63, 83, and 87 simply by properly proportioning circuit elements now in use in the load circuits thereof. The $\gamma$ amplifier 75 may comprise a modified video-frequency amplifier. If a linear image-reproducing device is employed, the amplifiers 89*a*, 89*b*, and 89*c*** need not be utilized. However, for any additional circuit elements that may be required, the benefits of improved signal-to-noise ratio in the translation of the linearized-chromaticity type of NTSC signal and of deriving color signals at the receiver, which may be utilized in image-reproducing devices employing a wide variety of primary colors, are obtained.

Figure 3:
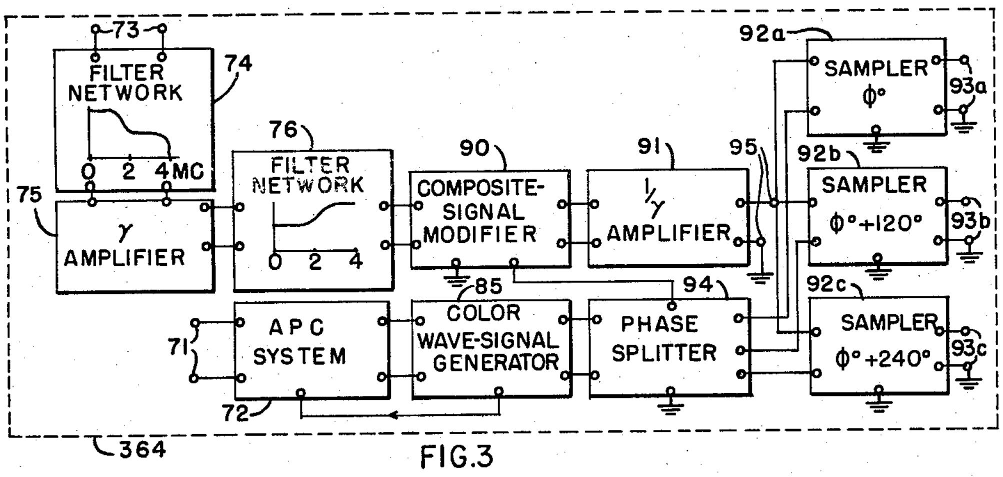

*Description of gamma-correction apparatus of Fig. 3*

In Fig. 2, the gamma-correction apparatus therein described utilized three $1/\gamma$ amplifiers for imparting to each of the color signals individually translated therethrough a $1/\gamma$ intensity characteristic. The utilization of three similar $1/\gamma$ amplifiers to effect this result may be unduly expensive and it may be preferable to employ only one such amplifier to provide gamma-correction for all of the color signals. The apparatus 364 of Fig. 3 includes such a single $1/\gamma$ amplifier. Since, except for the difference just mentioned and other changes required because of such difference, the gamma-correction apparatus of Figs. 2 and 3 are similar, corresponding units are identified by identical reference numerals.

The apparatus 364 of Fig. 3 includes in cascade, in the order named, the filter network 74, the gamma amplifier 75, the filter network 76, a composite-signal modifier 90, and a $1/\gamma$ amplifier 91. Three samplers **92*a*, 92*b*, and 92*c* are coupled to the output circuit of the amplifier 91 and individually coupled, respectively, to the pairs of output terminals 93*a*, 93*a*; 93*b*, 93*b*; and 93*c*, 93*c*. In addition, the apparatus 364 includes in cascade, in the order named, between the pair of input terminals 71, 71 and input circuits of the samplers 92*a*, 92*b*, and 92*c*, the automatic-phase-control system 72, the color wave-signal generator 85, and a phase splitter 94. An output circuit of the phase splitter is also coupled to an input circuit of the signal modifier 90**.

The composite signal modifier 90 is of a type more fully described in the January 1954 Proceedings of the I.R.E. in an article entitled "Processing of the NTSC Color Signal for One-Gun Sequential Color Displays" at pages 299–308, inclusive, and, specifically, at pages 302, 303 of such article. Such a modifier is also more fully described in applicant's copending application Serial No. 339,145, filed February 26, 1953, entitled "Color-Television Receiver." Specifically, a modifier of this type is one in which, by employing a locally developed signal having a frequency harmonically related to that of the subcarrier wave signal, an NTSC type of signal such as previously described herein and defined by Equation 2 above is modified to become a signal more familiarly known as a "dot-sequential" type of signal. The latter signal is to be considered more fully hereinafter. As described in the last-mentioned I.R.E. article and in the application referred to, a correction signal is derived in such modifier for converting the luminance signal Y to a dot-sequential type of monochrome signal M and the NTSC type of subcarrier wave signal with its modulation components is modified to a dot-sequential type of subcarrier wave signal with its modulation components. To effect the latter result, the unit 90 also includes means for developing a signal harmonically related to the signal developed in the generator 85, for example, a resonant circuit tuned to the harmonic frequency and excited by such generated signal.

The samplers **92*a*, 92*b*, and 92*c* are essentially electron-switching devices for electrically and periodically coupling circuits for translating portions of the dot-sequential type of signal applied to such samplers. For example, the samplers 92*a*, 92*b*, and 92*c* become conductive at times corresponding to the phases 0°, 120°, and 240° of the applied dot-sequential signal and translate portions of such signal representing the red, green, and blue color signals to the cathodes of the image-reproducing device for developing red, green, and blue primary images. Details of such samplers are considered in an article in the October 1951 Proceedings of the I.R.E. starting at page 1280. Other means for developing the desired color signals, for example, conventional synchronous demodulators in combination with a shunted monochrome channel may be employed, as will be explained more fully hereinafter. The phase splitter 94 may be a conventional type of phase-splitting circuit for developing signals with proper phase relation to the subcarrier wave signal to cause the samplers 92*a*, 92*b*, and 92*c*** to become conductive at the proper times.

*Operation of the gamma-correction apparatus of Fig. 3*

In order to effect gamma-correction for each of the color signals, while these signals are components of a composite video-frequency signal, for reasons which will be considered more fully hereinafter when explaining the operation of the amplifier 91 and the samplers **92*a*, 92*b*, and 92*c***, it is desirable to have a composite signal in which each cycle thereof can be divided into three portions of equal duration corresponding to the three desired color signals. In other words, it is desirable to have a composite signal in which the instantaneous amplitudes at, for example, the phase angles 0°, 120°, and 240° represent the potentials of the three color signals. A composite video-frequency signal of the type just described and which may be so sampled is called a dot-sequential signal $S_d$ and is defined as follows:

$$S_d=M+\tfrac{2}{3}R\cos \omega t+\tfrac{2}{3}G\cos(\omega t+120^\circ)+\tfrac{2}{3}B\cos(\omega t+240^\circ) \quad (8)$$

where:

M is the brightness component and is composed of equal amounts of R, G, and B components.

A signal of the NTSC type is defined by Equation 2 above.

Considering now the operation of the apparatus 364 of Fig. 3 to develop and utilize such a dot-sequential signal, the linearized-chromaticity type of composite video-frequency signal developed at a transmitter, such as described with respect to Fig. 1, is applied to the input terminals 73, 73 and the units 74, 75, and 76 operate in the manner described above with respect to Fig. 2 to develop a linear composite video-frequency signal in which neither the chrominance nor luminance component has been gamma-corrected. This linear composite video-frequency signal is of the NTSC type and is modified in the unit 90 in a manner more fully described in the article referred to in the January 1954 issue of the I.R.E. and in the copending application Serial No. 339,145 to develop in the output circuit of the unit 90 a dot-sequential type of signal such as defined by Equation 8 above. This dot-sequential type of composite video-frequency signal is nonlinearly translated through the $1/\gamma$ amplifier 91 and the samplers **92*a*, 92*b*, and 92*c*** sample the potentials of such gamma-corrected dot-sequential signal at the 0°, 120°, and 240° phases thereof to develop color signals representative of the green, red, and blue of the image. These color signals are gamma-corrected for reasons now to be considered.

When a signal is translated through a nonlinear device such as the amplifier 91, the nonlinear deformation or gamma-correction thereof can be considered to occur because of either of two different modes of operation. The simplest explanation, though not the most useful for all purposes, is that the intensity of each instantaneous element of a signal applied to a $1/\gamma$ device is raised to the $1/\gamma$ power as it is translated through such device provided the device has sufficient band width. Considered thusly, it is apparent that the color-signal modulation components at different phases will be nonlinearly translated and thus gamma-corrected. Another equally valid and more useful perspective is to consider the nonlinearity as being obtained by the combination of the fundamental components of the applied signal with higher harmonic components thereof generated in the nonlinear device to develop the nonlinear signal in the output circuit of the device. A Taylor Series analysis of the relative effects of fundamental and higher harmonic components in determining the composite nonlinear effect on a signal of the dot-sequential type results in the conclusion that the monochrome signal, a subcarrier wave signal at the fundamental frequency and a subcarrier wave signal at the second harmonic frequency combine to contribute most of the nonlinear effect. For more accurate gamma-correction, harmonic components higher than the second are used and these correct for improper reproduction of the saturated primary colors which otherwise tends to occur.

In gamma-correction apparatus such as represented by Fig. 3, the modulation components at 120° phase intervals of the subcarrier wave signal applied to the $1/\gamma$ amplifier 91 individually represent different ones of the primary colors. The components at corresponding phase angles of the fundamental wave signal in the output circuit of the unit 91, modified by the higher harmonic wave signal, are gamma-corrected and continue individually to represent different ones of the primary colors. Therefore, to select such gamma-corrected components to develop gamma-corrected color signals, the output circuit of the amplifier 91 should be of sufficiently wide band not to attenuate at least the third harmonic of the fundamental subcarrier wave signal and its side bands, that is, such output circuit should have an upper limit of approximately 12.3 megacycles if each side band is 1.5 megacycles. When such gamma-corrected dot-sequential signal is applied to the samplers **92*a*, 92*b*, and 92*c***, such samplers should be conductive for a period corresponding to a narrow phase angle of the subcarrier wave signal to select each of the color signals. Due to the inherent wide-band characteristics of samplers for translating pulse-type signals, color signals which are gamma-corrected are developed in the output circuits thereof. Effectively, such samplers translate the fundamental components and heterodyne the higher harmonic components down to the band including the fundamental components so that the sampled signal in each output circuit includes not only fundamental but also higher harmonic effects. This heterodyning will be considered more fully hereinafter with respect to Fig. 3*a*.

In view of the above considerations, the replacement of the samplers **92*a*, 92*b*, and 92*c*** by a shunted monochrome type of demodulation system is simply effected by utilizing one channel for translating all of the monochrome information, a demodulator system in a shunt channel for deriving all of the fundamental information, and other demodulator systems individually in different other shunt channels for deriving higher harmonic information. The monochrome, fundamental, and higher harmonic information for each gamma-corrected color signal is then combined to develop such signal, thereby to provide three gamma-corrected color signals representative of the three primary colors.

Figure 3A:
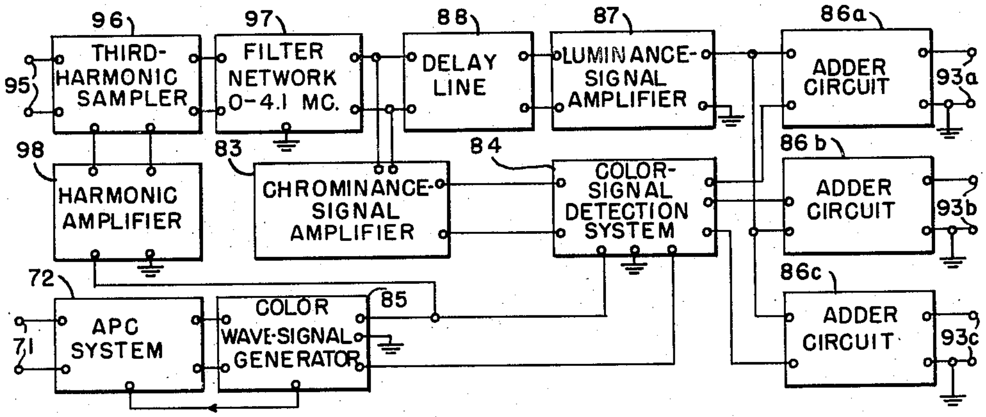

*Description and explanation of operation of gamma-correction apparatus of Fig. 3a*

In apparatus such as described with reference to Fig. 3, it may be desirable to utilize a simple, shunted-monochrome decoding system having separate signal-translating channels for the luminance and chrominance signals. The circuits of Fig. 3*a* represent such a modified form of the decoding system of the apparatus of Fig. 3. In view of the shunted-monochrome nature of the circuits represented by Fig. 3*a*, these circuits correspond generally with circuits in the shunted monochrome receiver of Fig. 2 and, accordingly, corresponding units in these figures are identified by identical reference numerals.

In the modified form of gamma-correction apparatus of Fig. 3*a*, the samplers **92*a*, 92*b*, and 92*c* of Fig. 3 are replaced by a third harmonic sampler 96**. The samplers of Fig. 3 differ from that of Fig. 3*a* in that the unit 96 is, for example, a single tube circuit designed to operate at a sampling frequency of three times that of the subcarrier wave signal for reasons to be discussed more fully hereinafter. The output circuit of the sampler 96 is coupled through a filter network 97 having a 0–4.1 megacycle pass band to input circuits of the luminance-signal amplifier 87 and the chrominance-signal amplifier 83. An input circuit of the sampler 96 is coupled through a harmonic amplifier 98, which develops a signal having three times the frequency of the subcarrier wave signal, to the output circuit of the generator 85. The amplifier 98 has such phase-translating characteristic that the third harmonic signal developed therein has, for example, positive peaks in coincidence with the 0°, 120°, and 240° phase angles of the subcarrier wave signal applied to the sampler 96 through the terminals 95, 95.

In the portion of the gamma-correction apparatus represented by Fig. 3*a*, the sampler 96 serves a purpose similar to that of the samplers **92*a*, 92*b*, and 92*c*** of Fig. 3 insofar as effectively developing three video-frequency components representing the primary colors and which are gamma-corrected. However, whereas three samplers are employed in the apparatus of Fig. 3 only one is employed in Fig. 3*a* and, whereas three 0–4.1 megacycle gamma-corrected color signals are developed by the samplers of Fig. 3, one, composite, 0–4.1 megacycle gamma-corrected, dot sequential signal is developed by the sampler 96 of Fig. 3*a* and translated through the network 97. The units 83–88, inclusive, of Fig. 3*a* operate in a manner similar to that of the corresponding units of Fig. 2 to develop three gamma-corrected color signals.

The operation of the sampler 96 to develop a gamma-corrected, dot-sequential signal is based on the principles discussed with respect to the samplers of Fig. 3. The wideband, gamma-corrected, dot-sequential signal applied to the sampler 96 includes fundamental and higher harmonic components. All of these components contribute to the gamma correction and, therefore, at least effectively, all such components should be translated if a reasonable degree of gamma-correction is to be retained. However, direct translation and utilization of even those components including the third harmonic of the modulated subcarrier wave signal and its side bands would require circuits having pass bands of approximately 12 megacycles. Such wide-band circuits are not desirable and, as an alternative, where pass bands of approximately 4.1 megacycles are conventionally utilized in the receiver, all of the harmonic information can be heterodyned down to components within such 4.1 megacycle pass band.

Figure 4:
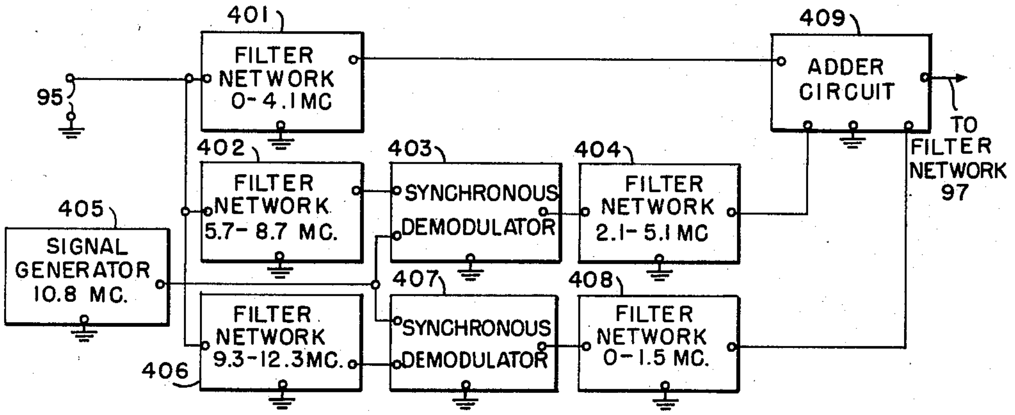
Fig. 4 represents apparatus useful in explaining the operation of the embodiment of Fig. 3*a*.

The operation of the sampler 96 in effecting such heterodyning is analogous to the more easily understandable operation of apparatus such as represented by Fig. 4. The sampler 96 effects direct translation, that is, without heterodyning, of components in the video-frequency band, that is, components of approximately 0–4.1 megacycles. This translation corresponds to that through a network such as the unit 401 of Fig. 4. In addition, the 10.8 megacycle sampling signal in the sampler 96 effectively heterodynes with a second harmonic or 7.2 megacycle subcarrier wave signal having 1.5 megacycle side bands and developed in the $1/\gamma$ amplifier to develop a subcarrier wave signal of 3.6 megacycles with 1.5 megacycle side bands. This operation is represented by the operation of units 402–405, inclusive, of Fig. 4. Further, if higher harmonic components are considered, and all harmonic components are utilized in a sampler such as the unit 96, the 10.8 megacycle sampling signal in the unit 96 effectively heterodynes with a third harmonic or 10.8 megacycle subcarrier wave signal to derive modulation components of 0–1.5 megacycle band width. This operation is represented by the operation of units 405–408, inclusive, of Fig. 4. In a similar manner all higher harmonic subcarrier wave signals are effectively heterodyned down to either a fundamental subcarrier wave signal such as in the output circuit of the unit 404 of Fig. 4 or derived modulation components such as in the output circuit of the unit 408 of Fig. 4. All of these signals are combined to develop a 0–4.1 megacycle signal which is properly gamma-corrected. In such combination all of the fundamental subcarrier wave signals combine to develop the desired gamma-corrected subcarrier wave signal while all of the derived modulation components combine to modify the monochrome signal to a gamma-corrected signal. All signals above 4.1 megacycles are cut off by the upper limit of the filter network 97 of Fig. 3*a*.

To summarize the above, the sampler 96 effectively heterodynes all of the harmonic frequency information down to components of a composite signal in a 0–4.1 megacycle pass band so that such composite signal is properly gamma-corrected, effectively including all of the required harmonic frequency information. Due to the symmetrical relation in phase of all of the components representative of the primary colors and the symmetrical operation of the sampler, such components also are gamma-corrected and are derived as gamma-corrected color signals in a conventional manner.

Figure 5:
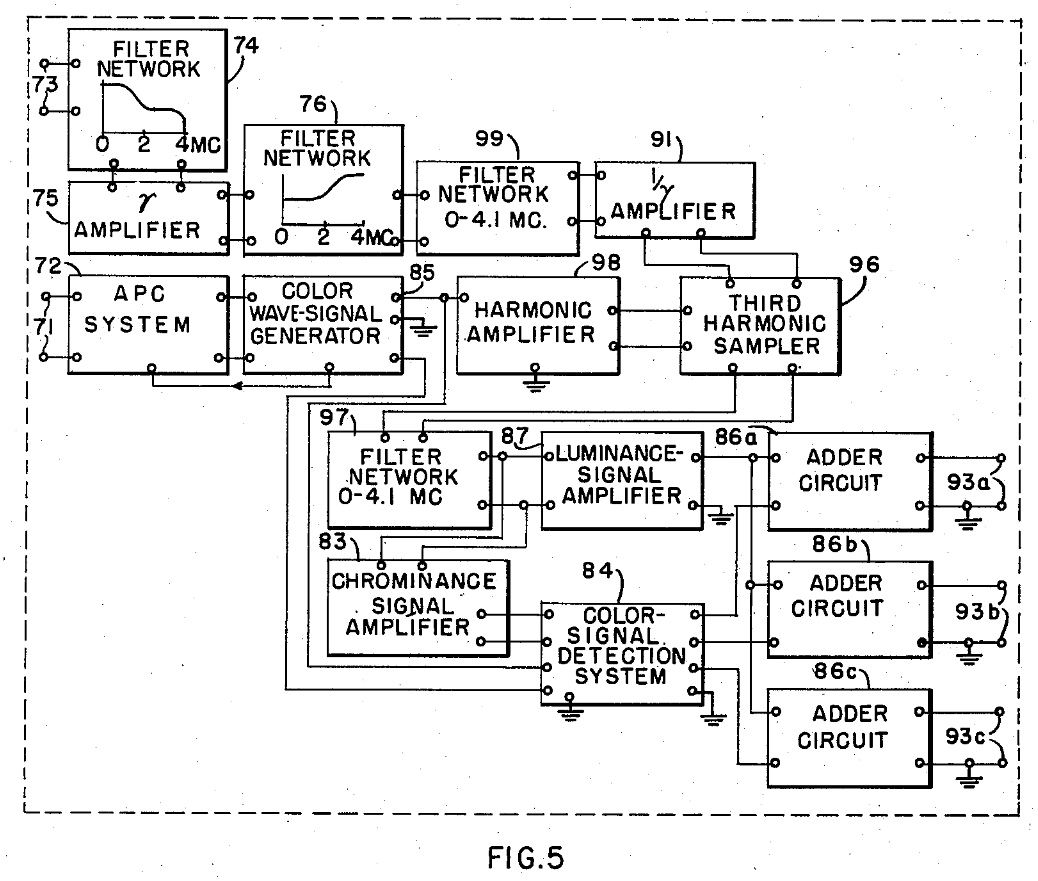
Fig. 5 is a schematic diagram of a further embodiment of the gamma-correction apparatus of Fig. 2.

*Description and explanation of operation of gamma-correction apparatus of Fig. 5*

The apparatus represented by Figs. 3 and 3*a* is based on the conclusion that an NTSC type of signal, such as defined by Equation 2 above, is not sufficiently symmetrical in the phase relation of the modulation components of the subcarrier wave signal representative of red, green, and blue to be translated through a sampler such as 96 where the sampling occurs at equal, for example, 120° phase intervals. The need for such apparatus as represented by Figs. 3 and 3*a* is also founded on the conclusion that the modulation components of such subcarrier wave signal tend to have unequal luminance effects in a reproduced image over the range of composite colors definable by such components. These characteristics relate to the degree of "circularity" of the subcarrier wave signal and are discussed more fully in an article entitled "The Constant Luminance Principle in NTSC Color Television" by W. F. Bailey in the January 1954 issue of the Proceedings of the I.R.E. at pages 60–66, inclusive, and particularly pages 65, 66. In the apparatus of Figs. 3 and 3*a*, a linearized chromaticity type of NTSC signal is first converted to a dot-sequential type of signal in which the color-modulation components are symmetrically disposed in-phase at intervals of 120°. Actually, however the angular differences between the phases of the red, green, and blue modulation components of an NTSC signal do not differ to too great a degree, that is, they differ by 138°, 106°, and 116°. Also, the luminance effects of the modulation components over the range of composite colors are not so unequal as completely to prevent the utilization of direct gamma-correction of an NTSC type of signal if less than substantially complete gamma-correction is acceptable. In other words, as concluded in the article by Bailey, the subcarrier wave signal of the NTSC signal does not deviate too much from "circularity." Fig. 5 represents gamma-correction apparatus in which a linearized-chromaticity type of signal is directly gamma-corrected without initial conversion to a dot-sequential type of signal. Since the apparatus of Fig. 5 differs from that of Fig. 3 when modified to include the circuits of Fig. 3*a* only in the elimination of units for converting the linearized chromaticity type of NTSC signal to a dot-sequential signal, corresponding units are identified by identical reference numerals.

In the apparatus of Fig. 5, the output circuit of the nonuniform filter network 76 is coupled directly through a 0–4.1 megacycle filter network 99 to the input circuit of the $1/\gamma$ amplifier 91. The linear NTSC signal developed in the output circuit of the network 76 is translated through the filter network 99 and applied to the amplifier 91. In such amplifier 91, the modified NTSC signal is gamma-corrected. As described with reference to Figs. 3 and 3*a*, at predetermined phases of the wide-band signal in the output circuit of the amplifier 91, potentials representative of the red, green, and blue colors of the televised image properly gamma-corrected are present. When the signal in the output circuit of the amplifier 91 is an NTSC type signal, if the phase of the color-synchronizing signal is considered to be 180°, as is conventional, the component representative of red is at +103°, that representative of green at +244°, and that representative of blue at +347°. In order to effect a minimum of color distortion and still employ symmetrical sampling at 120° phase intervals, the third harmonic signal developed in the amplifier 98 and applied to the sampler 96 is phase adjusted to cause the sampler to be conductive at approximately the phase angle of the component representative of red, that is, at approximately +103° in each cycle of the subcarrier wave signal applied to the sampler 96 from the output circuit of the amplifier 91. This will cause red to be correct while blue will be sampled with a phase error of approximately 4° and green with a phase error of approximately 18°. The error in sampling with respect to the different color signals may be varied by changing the angle at which red is sampled to any desired degree, if other sampling angles are considered to provide improved color.

As explained with respect to Figs. 3 and 3*a*, the red, green, and blue components of the signal translated through the network 97 are gamma-corrected and are derived by means of the units 83–87, inclusive, in a conventional manner. The operation of the detection system 84 is the same as that of the corresponding unit of Fig. 2.

A comparison of the operations of units 20, 22, and 23 of Fig. 1 and units 99, 91, 96, and 97 of Fig. 5 indicate that a universal gamma-correction apparatus can be constructed for developing either a linearized-chromaticity or a nonlinearized-chromaticity type of NTSC signal or for developing unclassified gamma-corrected signals having characteristics of both of such NTSC signals to different degrees. Referring to Fig. 1, a linear NTSC signal, as defined by Equation 2 above is applied to the network 20 and a linearized-chromaticity type of NTSC signal, as defined by Equation 7 above, is developed in the output circuit of the network 23. The $Y^{1/\gamma}$ term of the latter signal may be expressed in terms of the R, G, and B components thereof as follows:

$$Y^{1/\gamma}=(.30R+.59G+.11B)^{1/\gamma} \qquad (9)$$

The chrominance term of Equation 7 is not raised to the $1/\gamma$ power. As previously discussed herein, though the signal defined by Equation 7 is desirable for translation from the transmitter to a receiver, for reasons previously considered it cannot be utilized directly at a receiver where the color signals need gamma-correction.

Referring now to Fig. 5, again a linear NTSC signal as defined by Equation 2 above is applied to a filter network, specifically, the network 99. However, a nonlinearized-chromaticity type of NTSC signal is developed in the output circuit of the network 97, that is, the developed signal has proper gamma-correction for the color signals to permit linear decoding and translation of such signal and direct utilization of the decoded signals in a nonlinear reproducing device. The luminance component of the latter NTSC signal is defined as follows:

$$Y'=.30R^{1/\gamma}+.59G^{1/\gamma}+.11B^{1/\gamma} \qquad (10)$$

Comparison of Equations 9 and 10 shows that translation of a luminance component having a normal level and an attenuated chrominance component through a $1/\gamma$ amplifier as in Fig. 1 causes a luminance component such as defined by Equation 9 to be developed while translation of both luminance and chrominance components at normal levels through a similar $1/\gamma$ amplifier causes a luminance component such as defined by Equation 10 to be developed. The difference is explainable as a result of the effect of the nonlinear translation of the chrominance component and of the resultant effect of such nonlinearly translated chrominance component on the luminance component. Additionally, since the signal in the output circuit of the network 97 of Fig. 5 is a nonlinear chromaticity type of NTSC signal equivalent to that now considered conventional, that is, is a signal from which gamma-corrected color signals may be derived by means of a linear derivation operation, the chrominance components and chromaticity information of such signal correspond to those of the "conventional" NTSC signal. This indicates that, in the conversion of the signal translated through the units 99, 91, 96, and 97 of Fig. 5 to a "conventional" NTSC signal, the subcarrier wave signal is modulated by the luminance signal to develop a relationship of the subcarrier wave signal to luminance which is representative of chromaticity and, further, the higher harmonics of the subcarrier wave signal so modify the fundamental subcarrier wave signal that the relationship of the subcarrier wave signal to chromaticity is nonlinear as in the "conventional" NTSC signal.

The above considerations lead to the conclusion that the types of NTSC signals discussed and other signals may be developed by proportioning the relative signal levels of the luminance and chrominance signals applied to a nonlinear device. Apparatus making use of such conclusion is described with reference to Fig. 6.

Figure 6:
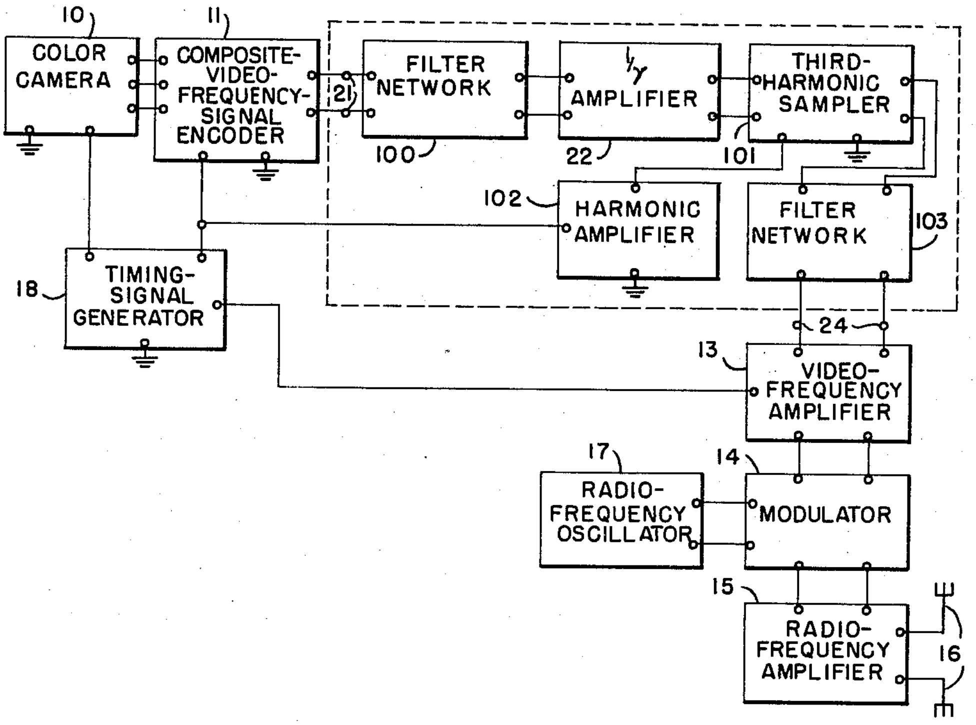
Fig. 6 is a schematic diagram of a modified form of the transmitter of Fig. 1.

*Description and explanation of operation of gamma-correction apparatus of transmitter of Fig. 6*

The gamma-correction apparatus of the transmitter of Fig. 6 is of a universal type previously discussed with reference to Fig. 5 for developing a linearized chromaticity or nonlinearized chromaticity type of NTSC signal or for developing other gamma-corrected signals having characteristics of both of such NTSC signals to different degrees. Since the transmitter of Fig. 6, except for the gamma-correction apparatus therein, is generally similar to the transmitter of Fig. 1, corresponding units are identified by identical reference numerals.

The output circuit of the encoder 11 in the transmitter of Fig. 6 is coupled in cascade, in the order named, through a filter network 100, a $1/\gamma$ amplifier 22, a third harmonic sampler 101, and a filter network 103. The output circuit of the generator 18, which is coupled to the encoder 11 for the purpose of applying a signal of subcarrier frequency thereto, is also coupled through a harmonic amplifier 102 to an input circuit of the sampler 101. The amplifier 102 develops a signal which is the third harmonic of the modulated subcarrier wave signal and which is phased with respect to the subcarrier wave signal as considered hereinbefore with respect to Figs. 3*a* and 5. The sampler 101 is identical in structure and mode of operation with the sampler 96 of Fig. 5. The filter networks 100 and 103 may comprise, for example, simple 0–4.1 megacycle units having a uniform pass band or, if desired, for purposes more fully considered hereinafter, may have complementary non-uniform pass bands.

As described with reference to the gamma-correction apparatus of Fig. 5, a linear composite video-frequency signal having luminance and chrominance components which have not been gamma-corrected are translated through the network 100 and the $1/\gamma$ amplifier 22 in the order named. When the pass band of the network 100 is uniform, the amplifier 22 effects a nonlinear translation of both the luminance and chrominance components and effectively develops in the output circuit thereof of a wide-band composite video-frequency signal having a component representative of luminance, a fundamental component representative of the modulated subcarrier wave signal initially applied to the unit 22, and higher harmonic components resulting from the nonlinear translation of such wave signal, as previously discussed herein.

For reasons more completely considered when explaining the operation of the apparatus of Fig. 5, such wide-band, video-frequency signal after translation through the sampler 101 becomes a 0–4.1 megacycle signal having gamma-corrected luminance and chrominance components and in which the components representative of the primary color are also gamma-corrected. In other words, the latter composite signal is the nonlinearized-chromaticity or "conventional" type of NTSC signal conventionally used. Such signal is then translated through the network 103, having a pass band of 0–4.1 megacycles, to eliminate all frequency components higher than 4.1 megacycles and is transmitted by means of the operation of the units and circuit elements 13–17, inclusive, as described with reference to Fig. 1.

As discussed with reference to Fig. 5, the character of the signal developed by the gamma-correction apparatus depends on the degree of uniformity of the pass bands of the filter networks 100 and 103 of Fig. 6. The sampler 101 has no substantial effect unless harmonic subcarrier wave signals are developed in the amplifier 22 and such are not developed, for all practical purposes, if the subcarrier wave signal applied to the amplifier 22 is substantially attenuated with respect to the luminance signal as in Fig. 1. Without harmonic subcarrier wave signals the sampler 101 is effectively a conductor connecting the units 22 and 103. Consequently, if the networks 100 and 103 of Fig. 6 individually have the pass bands of corresponding ones of the networks 20 and 23 of Fig. 1, a linearized-chromaticity type of NTSC signal is developed in the output circuit of the network 103. The gamma-correction apparatus of Fig. 6 effects universal gamma-correction at the control of the user. The two types of NTSC signal described herein may be developed or any type of NTSC signal within the range of which those two types are limits may likewise be developed.

A nonlinearized chromaticity type of NTSC signal developed by means of apparatus such as that of Figs. 5 and 6 has a beneficial characteristic not in a corresponding signal developed by prior conventional gamma-correction apparatus. To understand the benefit obtained, it is helpful to reconsider the degree of gamma-correction desired.

In a monochrome type of receiver, the nonlinear effects of the reproducing device are not too disturbing to the viewer and the degree of gamma-correction is not too important. However, in a color receiver employing a nonlinear image-reproducing device the signals representative of chrominance tend to disturb the luminance of the reproduced image and constant luminance reproduction is not obtained unless the signals applied to such device have been initially translated through channels which have nonlinear effects on such signals complementary to the nonlinear effects of the reproducing device. Constant luminance loss or failure is very disturbing to the viewer and, consequently, such initial nonlinear correction of such signals should be reasonably accurate. As previously discussed herein, gamma-correction of such type as to provide constant luminance to a high degree is obtainable by developing and utilizing a linearized chromaticity type of NTSC signal. However, such type of NTSC signal is not widely used at the present time, a nonlinearized chromaticity type of NTSC signal being more prevalent. The latter type of NTSC signal may continue to be used even though such signal does not provide constant luminance to the same degree as the linearized chromaticity type. One of the deficiencies of the nonlinearized chromaticity type of signal as now developed and utilized is that an increasing percentage of the luminance information is translated through the relatively narrow pass band of the chrominance channel as the colors approach saturation. This results in both the loss of fine detail because of the limited pass band of the channel and an increasing loss in constant luminance. At least part of this deficiency is attributable to the manner in which the luminance component Y′ of such NTSC signal is developed. As previously discussed with respect to Fig. 5, such Y′ component and the chrominance component are developed from gamma-corrected R, G, and B colors each having a band width of approximately 4 megacycles.

The Y′ component of the nonlinearized chromaticity type of NTSC signal developed in apparatus such as described with reference to Fig. 6 does not have this deficiency at least to the same degree. In the apparatus of Fig. 6, gamma-correction of the luminance component is effected by modifying a $Y^{1/\gamma}$ component to a Y′ component, as described with reference to Fig. 5. This modification is effected by a modulation of the $Y^{1/\gamma}$ component by the nonlinearly translated chrominance signal and its harmonics. Since such chrominance signal includes only narrow-band modulation components having band widths no greater than 1.5 megacycles, effectively only the lower frequency components of the $Y^{1/\gamma}$ signal are suppressed or modified to a Y′ signal while similar suppression of the higher frequency components does not occur. Since change from $Y^{1/\gamma}$ to Y′ comprises a suppression in signal level, this lack of suppression of the higher frequency components effectively causes the Y′ signal developed to have boosted high-frequency components. Such boost diminishes the luminance effects previously discussed and thus the nonlinearized chromaticity type of NTSC signal developed by means of apparatus such as represented by Fig. 6 is preferable to that developed by conventional apparatus.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit for translating said composite signal and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means responsive to said translated composite signal for effecting one degree of modification of a characteristic of said subcarrier wave signal and another degree of modification of the same characteristic of at least a frequency component of said first signal to develop a gamma-corrected composite television signal.

2. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit for translating said composite signal and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means responsive to said translated composite signal for effecting one degree of modification of the amplitude of said subcarrier wave signal and another degree of modification of the amplitude of the low-frequency component of said first signal to develop a gamma-corrected composite television signal.

3. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit for translating said composite signal and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means responsive to said translated composite signal for effecting phase and amplitude modification of said subcarrier wave signal and amplitude modification of said first signal to develop a gamma-corrected composite television signal.

4. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit and having a nonlinear signal-translating characteristic for said first signal to correct the gamma of said first signal and a linear signal-translating characteristic for said subcarrier wave signal which varies as a function of the intensity of said first signal so as effectively to modulate said subcarrier wave signal by said first signal; and signal-modifying means responsive to said translated composite signal for effecting one degree of modification of a characteristic of said subcarrier wave signal and another degree of modification of the same characteristic of said first signal to develop a gamma-corrected composite television signal.

5. Gamma-correction apparatus for a color-television system comprising: a circuit for supplying a composite television signal including a first signal primarily representative of the luminance and a modulated subcarrier wave signal representative of the chrominance of a televised image and including a nonuniform filter network for translating said first and subcarrier wave signals with different degrees of attenuation; a gamma-correcting device coupled to said filter network including a nonlinear amplifier having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means responsive to said nonlinearly translated first signal and said linearly translated subcarrier wave signal for effecting one degree of modification of a characteristic of said linearly translated subcarrier wave signal and another degree of modification of the same characteristic of said nonlinearly translated first signal to develop a gamma-corrected composite television signal.

6. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit for translating said composite signal and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means responsive to said translated composite signal and including nonuniform filter network means for effecting one degree of attenuation of the amplitude of said subcarrier wave signal and another degree of attenuation of the amplitude of said first signal to develop a gamma-corrected composite television signal.

7. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit for translating said composite signal and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said nonlinearly translated first signal; and signal-modifying means responsive to said translated composite signal and including a nonuniform filter network for effecting one degree of attenuation of the amplitude of said subcarrier wave signal and another degree of attenuation of the amplitude of the low-frequency component of said first signal to develop a gamma-corrected composite television signal.

8. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means coupled to said gamma-correcting device for sampling said translated composite signal at a frequency in excess of that of said subcarrier wave signal to effect one degree of modification of a characteristic of said subcarrier wave signal and another degree of modification of the same characteristic of said first signal to develop a gamma-corrected composite television signal.

9. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and means including a signal-modifying device coupled to said gamma-correcting device for sampling said translated composite signal at a frequency in excess of that of said subcarrier wave signal to effect phase and amplitude modification of said subcarrier wave signal and amplitude modification of said first signal to develop a gamma-corrected composite television signal.

10. Gamma-correction apparatus for a color-television system comprising: circuit means for supplying a composite television signal including a first signal primarily representative of the luminance and a modulated subcarrier wave signal representative of the chrominance of a televised image; means including a gamma-correcting device coupled to said supply circuit and having a nonlinear signal-translating characteristic for said first signal to correct the gamma of said first signal and a signal-translating characteristic for said subcarrier wave signal which varies as a function of the intensity of said first signal so as effectively to modulate said subcarrier wave signal by said first signal; and signal-modifying means coupled to said gamma-correcting device for sampling said translated composite signal at a rate equal to the third harmonic of said subcarrier wave signal to modify the amplitude and phase of said subcarrier wave signal and the amplitude of said first signal to develop a gamma-corrected composite television signal.

11. Gamma-correction apparatus for a color-television system comprising: circuit means for supplying a composite television signal including a first signal primarily representative of the luminance and a modulated subcarrier wave signal representative of the chrominance of a televised image and including first filter network means for attenuating said subcarrier wave signal with respect to said first signal; means including a gamma-correcting device coupled to said supply circuit and including a nonlinear ampilfier having a nonlinear signal-translating characteristic for said first signal to correct the gamma of said first signal and a signal-translating characteristic for said subcarrier wave signal which varies as a function of the intensity of said first signal so as effectively to modulate said attenuated subcarrier wave signal by said first signal; and signal-modifying means responsive to said translated first and attenuated subcarrier wave signals and including second filter network means for attenuating said translated first signal with respect to said attenuated subcarrier wave signal to develop a gamma-corrected composite television signal.

12. Gamma-correction apparatus for a color-television system comprising: circuit means for supplying a composite television signal including a first signal primarily representative of the luminance and a modulated subcarrier wave signal representative of the chrominance of a televised image and including first nonuniform filter network means for attenuating said subcarrier wave signal with respect to said first signal; means including a gamma-correcting device coupled to said supply circuit and including a nonlinear amplifier having a nonlinear signal-translating characteristic for said first signal to correct the gamma of said first signal and a signal-translating characteristic for said subcarrier wave signal which varies as a function of the intensity of said first signal so as effectively to modulate said attenuated subcarrier wave signal by said first signal; and signal-modifying means responsive to said translated first and attenuated subcarrier wave signals and including second filter network means which has a nonuniformity substantially complementary to that of said first network means for attenuating said translated first signal with respect to said attenuated subcarrier wave signal to develop a gamma-corrected composite television signal.

13. Gamma-correction apparatus for a color-television system comprising: circuit means for supplying a composite television signal including a first signal primarily representative of the luminance and a modulated subcarrier wave signal representative of the chrominance of a televised image and including first filter network means for attenuating said subcarrier wave signal substantially five times the attenuation of said first signal; means including a gamma-correcting device coupled to said supply circuit and including a nonlinear amplifier having a nonlinear signal-translating characteristic for said first signal to correct the gamma of said first signal and a signal-translating characteristic for said subcarrier wave signal which varies as a function of the intensity of said first signal so as effectively to modulate said attenuated subcarrier wave signal by said first signal; and signal-modifying means responsive to said translated first and attenuated subcarrier wave signals and including second filter network means for attenuating said translated first signal substantially five times the attenuation of said attenuated subcarrier wave signal by said other network to develop a gamma-corrected composite television signal.

14. Gamma-correction apparatus for a color-television system comprising: circuit means for supplying a composite television signal including a first signal the nonlinearity of which is a power function having $1/\gamma$ as the exponent and which is primarily representative of the luminance and a modulated subcarrier wave signal representative of the chrominance of a televised image; means including a gamma-correcting device coupled to said supply circuit for translating said composite signal and having a signal-translating characteristic which is a power function having the exponent of $\gamma$ for said first signal for changing said first signal to a linear signal and a signal-translating characteristic for said subcarrier wave signal which varies as a function of the intensity of said first signal so as effectively to modulate said subcarrier wave signal by said first signal; signal-modifying means responsive to said translated composite signal for modifying the amplitude of said subcarrier wave signal with respect to that of said linear first signal to develop a linear composite television signal in which the magnitude of the chrominance information is linearly related to the ratio of the magnitudes of the chrominance and luminance signals; means for deriving the modulation components of said modified subcarrier wave signal; means for combining said derived components and said linear first signal to develop color signals; and a plurality of other gamma-correcting devices each having a signal-translating characteristic which is a power function having the exponent substantially equal to $1/\gamma$ for translating said color signals to develop gamma-corrected color signals.

15. Gamma-correction apparatus for a color-television system comprising: circuit means for supplying a composite television signal including a first signal the nonlinearity of which is a power function having $1/\gamma$ as the exponent and which is primarily representative of the luminance and a modulated subcarrier wave signal representative of the chrominance of a televised image; means including a gamma-correcting device coupled to said supply circuit for translating said composite signal and having a signal-translating characteristic which is a power function having the exponent of $\gamma$ for said first signal for changing said first signal to a linear signal and a signal-translating characteristic for said subcarrier wave signal which varies as a function of the intensity of said first signal so as effectively to modulate said subcarrier wave signal by said first signal; signal-modifying means responsive to said translated composite signal for modifying the amplitude and phase of said subcarrier wave signal and the amplitude of said linear first signal to develop a linear composite television signal; and another gamma-correcting device having a signal-translating characteristic which is a power function having the exponent substantially equal to $1/\gamma$ for translating said linear composite television signal to develop a gamma-corrected composite television signal in which the magnitude of the chrominance information is linearly related to the ratio of the magnitudes of the chrominance and luminance signals.

16. Gamma-correction apparatus for a color-television system comprising: circuit means for supplying a composite television signal including a first signal the nonlinearity of which is a power function having $1/\gamma$ as the exponent and which is primarily representative of the luminance and a modulated subcarrier wave signal representative of the chrominance of a televised image; means including a gamma-correcting device coupled to said supply circuit for translating said composite signal and having a signal-translating characteristic which is a power function having the exponent of $\gamma$ for said first signal for changing said first signal to a linear signal and a signal-translating characteristic for said subcarrier wave signal which varies as a function of the intensity of said first signal so as effectively to modulate said subcarrier wave signal by said first signal; signal-modifying means responsive to said translated composite signal for modifying the amplitude of said subcarrier wave signal with respect to that of said linear first signal to develop a linear composite television signal; and another gamma-correcting device having a signal-translating characteristic which is a power function having the exponent substantially equal to $1/\gamma$ for translating said linear composite television signal to develop a gamma-corrected composite television signal in which the magnitude of the chrominance information is linearly related to the ratio of the magnitudes of the chrominance and luminance 17. Gamma-correction apparatus for a color-television system comprising: circuit means for supplying a composite television signal including a first signal the nonlinearity of which is a power function having $1/\gamma$ as the exponent and which is primarily representative of the luminance and a modulated subcarrier wave signal representative of the chrominance of a televised image and including first nonuniform filter network means for attenuating said subcarrier wave signal with respect to said first signal; means including a gamma-correcting device coupled to said supply circuit for translating said composite signal and having a signal-translating characteristic which is a power function having the exponent of $\gamma$ for nonlinearly translating said first signal for changing said first signal to a linear signal and linearly translating said attenuated subcarrier wave signal with a gain which is a function of the intensity of said first signal so as effectively to modulate said subcarrier wave signal by said first signal; signal-modifying means responsive to said nonlinearly translated first and linearly translated subcarrier wave signals including second filter network means the nonuniformity of which is complementary to that of said one network for modifying the amplitude of said linearly translated subcarrier wave signal with respect to that of said nonlinearly translated first signal to develop a linear composite television signal; and another gamma-correcting device having a signal-translating characteristic which is a power function having the exponent substantially equal to $1/\gamma$ for translating said linear composite television signal to develop a gamma-corrected composite television signal in which the magnitude of the chrominance information is linearly related to the ratio of the magnitudes of the chrominance and luminance signals.

References Cited in the file of this patent

UNITED STATES PATENTS

| | | |
|---|---|---|
| 2,280,532 | Norgaard | Apr. 21, 1942 |
| 2,509,987 | Newman | May 30, 1950 |
| 2,697,758 | Little | Dec. 21, 1954 |